C. A. DIES.
VALVE.
APPLICATION FILED JUNE 17, 1912.
1,182,359.
Patented May 9, 1916.
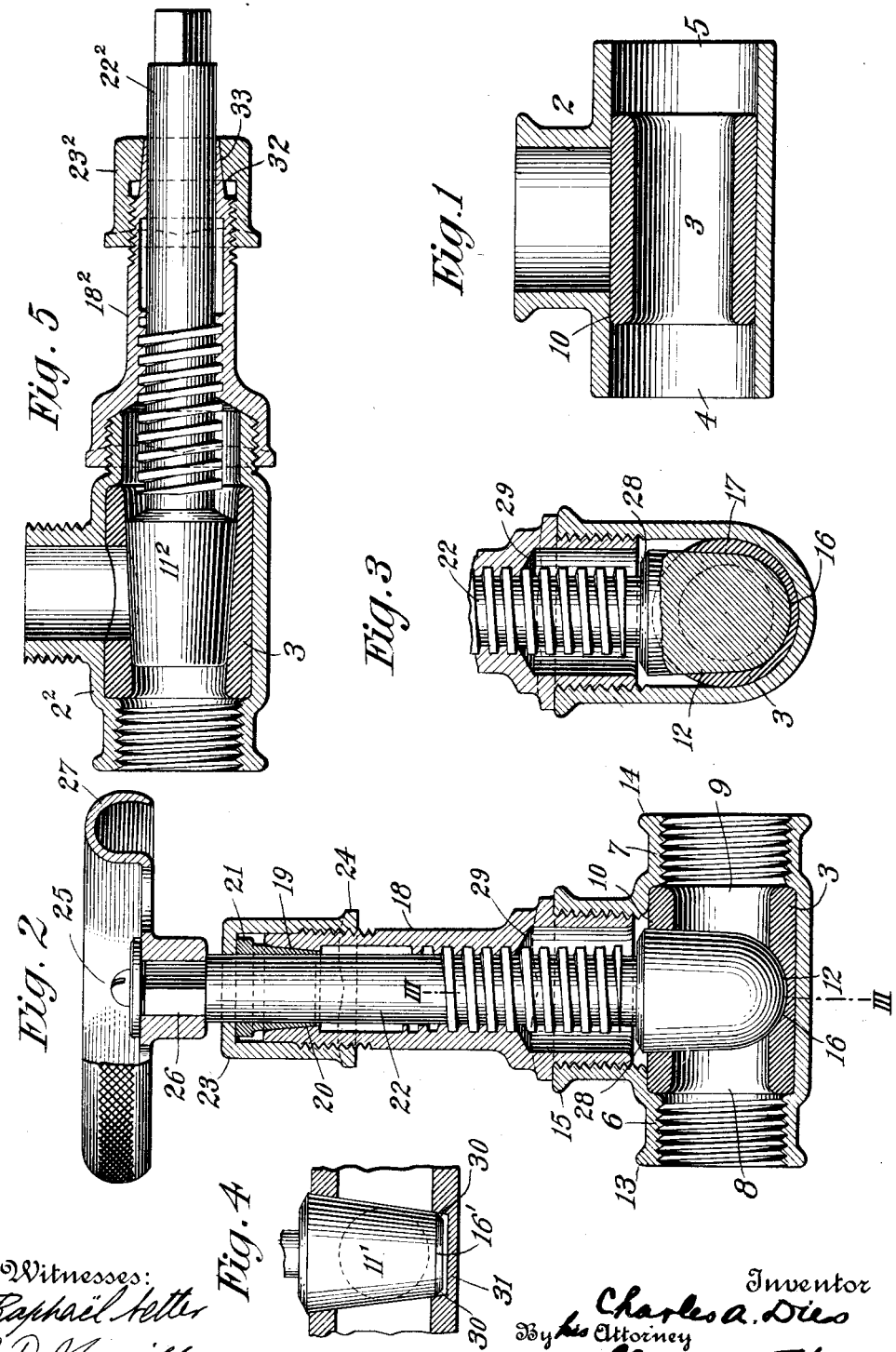
Witnesses:
Raphael Netter
C. D. Morrill
Inventor
Charles A. Dies
By his Attorney
Clarence Stein

UNITED STATES PATENT OFFICE.

CHARLES A. DIES, OF CHICAGO, ILLINOIS, ASSIGNOR TO CLAYTON MARK, OF CHICAGO, ILLINOIS.

VALVE.

1,182,359.   Specification of Letters Patent.   Patented May 9, 1916.

Application filed June 17, 1912. Serial No. 704,007.

*To all whom it may concern:*

Be it known that I, CHARLES A. DIES, a citizen of the United States, and a resident of Chicago, Cook county, Illinois, have invented a new and Improved Valve, of which the following is a specification, reference being had to the accompanying drawings, in which—

Figure 1 is a section of my valve in unfinished form; Fig. 2 is a section of the completed article; Fig. 3 is a section on lines III—III of Fig. 2, and Figs. 4 and 5 are modified forms of the valve.

My invention relates to valves and is designed to provide a much simpler and more economical valve, both as to construction and use, than those now in vogue. To this end my valve provides a direct passage for the fluid when the valve is opened, and when closed provides a tight, efficient, strong and durable joint.

My improved valve can be applied for use with T's, Y's, crosses, or other branch piping.

Referring to the drawings, the T shaped piece 2 is preferably made of stamped metal by the process described and claimed in my pending application, Serial No. 520,256, filed September 30, 1909, and 3 is an insert preferably of brass or other non-corrosive metal, which is designed to form a seat for the valve plunger. The seat 3 is driven into the T in any suitable manner into the position shown in Fig. 1, and the portions 4 and 5 of the T are then slightly compressed and reduced by suitable dies so that the inner walls 6 and 7 of the T will grasp the ends 8 and 9 of the seat 3, and hold it firmly in place, as is shown in Fig. 2. The wall 10 of the seat 3 is then apertured for reception of the plunger 11 and a recess 12 is also formed in the side walls and bottom of the seat 3 for the plunger 11, the lower end of which is of slightly greater diameter than the inside diameter of the seat. The T is then suitably threaded and its ends 13, 14 and 15 are upset, if desired. The plunger 11, preferably made of tool steel or other hard metal, has a ball shaped nose 16 and tapering sides 17, and is suitably mounted in the casing 18, which is screw-threaded into the part 15 of the T. The upper part 19 of the interior face of the casing 18 is beveled outwardly, and this beveled part 19 coacts with the downwardly tapered flange 20 of the washer 21 (preferably made of brass or other soft metal) which takes about the shaft 22 of the plunger 11. The cap 23, which has a wrench seat 24, and is screw-threaded to the casing 18, is adapted to bear against the upper surface of the washer 21 and to force it downwardly, so that the flange 20 will bind against both the part 19 and the shaft 22 and form a tight joint with these parts. The handle 25, which is mounted on the seat 26 of the shaft 22, is preferably comprised of stamped metal suitably bent over to provide gripping surfaces 27.

The valve plunger 11 has a beveled upper surface 28 which coacts when the valve is opened with the beveled surface 29 of the casing 18, and provides a tight joint so that the washer 21 may be removed and replaced when the valve is either wide open or closed. The joint made by the surfaces 28 and 29, moreover, protect the threads of the plunger shaft 22 from the corrosive action of steam, etc., when the valve is opened.

In Fig. 4 I show a modified form of plunger 11' having a flat ended nose 16' with slightly beveled edges 30 and the seat has a squared recess 31 to receive the nose 16'.

In Fig. 5 I show a modification of my valve applied to a branch pipe $2^2$ in which the sides of the plunger $11^2$ acts as a closure. In this form the casing $18^2$ takes about a branch of the T instead of entering it, and has an outwardly extending flange 32 which fits closely around the plunger shaft $22^2$ and upon which it is caused to bear by the cap $23^2$, the bore 33 of which is beveled to correspond to the bevel of the flange 32. The cap $23^2$ when it is tightened down on the flange 32 causes it to bind on the shaft $22^2$ and form a tight joint therewith, thereby eliminating the necessity of a stuffing box.

With my improved valve I prefer to make the seat 3 of brass, or other non-corrosive metal, and the plunger of steel or iron, thus giving a brass to iron connection which will not rust. I obtain great efficiency and durability by the use of a cylindrical plunger, since the absence of corners prevents wear thereof.

Many changes may be made by those skilled in the art in my improved valve without departing from my invention.

What I claim is:

1. In a valve, a branched piece having an inserted seat, said seat being secured in the branched piece by reduction of the ends of the branched piece, the seat having an unobstructed bore, and a plunger of as great a diameter as said bore, the plunger and said seat having corresponding wedging tapers.

2. In a valve, a branched piece having a thimble of non-corrodible metal therein, said thimble comprising a seat for a valve plunger, the said seat having an unobstructed bore, dished portions in said seat of greater diameter than the bore, the plunger being of greater diameter than the bore and having tapered sides, the said sides being adapted to bear against said seat in the said dished portions, and the said branched piece bearing against the ends of said thimble.

3. In a valve, a branched piece having therein an inserted seat, the branched piece being clamped and compressed about the ends of said seat, the seat having an unobstructed bore, a recess in said seat, and a plunger of greater diameter than said seat adapted to reciprocate and seat in said recess.

4. In a valve a branched piece having shouldered ends a thimble seated in said branched piece and held against movement along the long axis of the piece by the shoulders on the ends of the branched piece, said thimble having an unobstructed bore and containing a tapered portion forming a seat for a valve plunger.

CHARLES A. DIES.

Witnesses:
CARL O. BERGMAN,
E. A. BINGEL.

Copies of this patent may be obtained for five cents each, by addressing the "Commissioner of Patents, Washington, D. C."